US009582406B1

(12) United States Patent
Teplitsky et al.

(10) Patent No.: US 9,582,406 B1
(45) Date of Patent: Feb. 28, 2017

(54) METHOD AND SYSTEM FOR AUTOMATICALLY GENERATING EXECUTABLE SYSTEM-LEVEL TESTS

(71) Applicant: Cadence Design Systems, Inc., San Jose, CA (US)

(72) Inventors: Marat Teplitsky, Kfar-Sava (IL); Matan Vax, Ramot Menashe (IL); Amit Metodi, Ashkelon (IL)

(73) Assignee: CADENCE DESIGN SYSTEMS, INC., San Jose, CA (US)

( * ) Notice: Subject to any disclaimer, the term of this patent is extended or adjusted under 35 U.S.C. 154(b) by 288 days.

(21) Appl. No.: 14/462,852

(22) Filed: Aug. 19, 2014

(51) Int. Cl.
*G06F 17/50* (2006.01)
*G06F 11/36* (2006.01)

(52) U.S. Cl.
CPC .................. *G06F 11/3684* (2013.01)

(58) Field of Classification Search
CPC ............ G06F 17/5022; G06F 17/5027; G06F 17/5068; G06F 2217/86; G06F 13/22; G06F 13/4291; G06F 15/7864; G06F 17/5031; G06F 17/5045; G06F 2217/84; B81B 7/02; B81C 1/00238; B81C 1/00246
USPC ........................................ 716/100–109, 136
See application file for complete search history.

(56) References Cited

U.S. PATENT DOCUMENTS

| | | | |
|---|---|---|---|
| 8,560,893 B1 | 10/2013 | Hollander et al. | |
| 2006/0190871 A1* | 8/2006 | Likovich, Jr. .. | G01R 31/318314 716/104 |
| 2007/0033552 A1* | 2/2007 | Li ....................... | G06F 17/5022 716/103 |
| 2010/0095255 A1* | 4/2010 | Thompson ............ | G06F 17/504 716/106 |

OTHER PUBLICATIONS

U.S. Appl. No. 14/755,071, filed Jun. 30, 2015, Ovadia et al.

\* cited by examiner

*Primary Examiner* — Binh Tat
(74) *Attorney, Agent, or Firm* — Pearl Cohen Zedek Latzer Baratz LLP

(57) ABSTRACT

Method and system for automatically generating executable system-level tests. The method includes obtaining a system design including interrelation between components of the system design, actions the components are operable to perform, and constraints relating to the performance of the actions; receiving at least an initial action input to be tested; automatically generating a complete test scenario including: solving a logic layer CSP, including automatically scheduling actions and data paths of the test scenario, and assigning values to logic attributes of the actions and data, satisfying constraints relating to the logic layer, and solving a data layer CSP, satisfying constraints relating to data attributes taking into account the constraints relating to the logic layer; and generating the executable system-level test by assembling the initial action and the set of scheduled actions and data paths and the data attributes.

18 Claims, 5 Drawing Sheets

PRIOR ART  Fig. 1

METHOD AND SYSTEM FOR AUTOMATICALLY GENERATING EXECUTABLE SYSTEM-LEVEL TESTS

FIELD OF THE INVENTION

The present disclosure relates to system testing. More specifically, the present invention relates to method and system for automatically generating executable system-level tests.

BACKGROUND OF THE INVENTION

Design verification is a common process for testing an integrated circuit, board, or system-level architecture, to confirm that it complies with the requirements defined by the specification of the architecture for that device. Design verification for a device under test (DUT) may be performed on the actual device, or on simulated on a simulation model of the device.

Testing a design using a simulation model of the device involves using hardware description languages (HDL) such as Verilog and VHDL. These languages are designed to describe hardware at high levels of abstraction. The generated simulated model of the tested device can receive input stimuli in the form of test vectors, which are a string of binary values applied to the input of a circuit. The simulated model then produces results, which are checked against the expected results for the particular design of the device.

System level test generation typically entails representation of large abstract data models with complex set of rules. Automating the process of creating such data models is often prohibitively expensive in terms of time and computing power. Furthermore, performing the simulated test on the simulation model with numerous test vectors may consume enormous amounts of time and computing power.

SUMMARY OF THE INVENTION

There is thus provided, according to some embodiments of the present invention, a method for automatically generating executable system-level tests. The method may include obtaining a system design including interrelation between components of the system design, actions the components are operable to perform, and constraints relating to the performance of the actions. The method may also include receiving at least an initial action input to be tested by a user via an input device. The method may further include automatically generating a complete test scenatio for the system design that includes solving a logic layer CSP relating to a logic layer of an executable system- level test for the system design, including automatically scheduling actions and data paths of the test scenario, and assigning values to logic attributes of the actions and data, satisfying constraints relating to the logic layer, and solving a data layer CSP relating to a data layer of the executable system-level test for the system design, satisfying constraints relating to data attributes taking into account the constraints relating to the logic layer. The method may also include generating the executable system-level test by assembling the initial action and the set of scheduled actions and data paths and the data attributes wherein the executable system-level test includes executable code operable to perform a verification test on a system represented by the system design.

In some embodiments of the present invention, consecutively solving the CSPs may include solving the logic layer CSP before solving the data layer CSP.

According to some embodiments, the method may further include dividing the data layer CSP into independent sub-problems, where each sub-problem is a CSP.

In some embodiments of the present invention, obtaining of the system design may include constructing the system design.

According to some embodiments, the executable system-level test comprises an activity diagram.

In some embodiments, the method may further include further comprising receiving classification input from the user classifying attributes relating to the system design as logic layer attributes or data layer attributes.

There is also provided, according to some embodiments, a non-transitory computer readable storage medium for automatically generating executable system- level tests, having stored thereon instructions that when executed by a processor will cause the processor to: obtain a system design including interrelation between components of the system design, actions the components are operable to perform, and constraints relating to the performance of the actions; receive at least an initial action input to be tested by a user via an input device; automatically generate a complete test scenatio for the system design that includes solving a logic layer CSP relating to a logic layer of an executable system-level test for the system design, including automatically scheduling actions and data paths of the test scenario, and assigning values to logic attributes of the actions and data, satisfying constraints relating to the logic layer, and solving a data layer CSP relating to a data layer of the executable system-level test for the system design, satisfying constraints relating to data attributes taking into account the constraints relating to the logic layer; and generate the executable system-level test by assembling the initial action and the set of scheduled actions and data paths and the data attributes wherein the executable system-level test includes executable code operable to perform a verification test on a system represented by the system design.

According to some embodiments of the present invention, there is provided a system for automatically generating executable system-level tests. The system may include a memory and a processor configured to: obtain a system design including interrelation between components of the system design, actions the components are operable to perform, and constraints relating to the performance of the actions; receive at least an initial action input to be tested by a user via an input device; automatically generate a complete test scenatio for the system design that includes solving a logic layer CSP relating to a logic layer of an executable system-level test for the system design, including automatically scheduling actions and data paths of the test scenario, and assigning values to logic attributes of the actions and data, satisfying constraints relating to the logic layer, and solving a data layer CSP relating to a data layer of the executable system-level test for the system design, satisfying constraints relating to data attributes taking into account the constraints relating to the logic layer; and generate the executable system-level test by assembling the initial action and the set of scheduled actions and data paths and the data attributes wherein the executable system-level test includes executable code operable to perform a verification test on a system represented by the system design.

BRIEF DESCRIPTION OF THE DRAWINGS

In order to better understand the present invention, and appreciate its practical applications, the following figures are provided and referenced hereafter. It should be noted that the figures are given as examples only and in no way limit the scope of the invention. Like components are denoted by like reference numerals.

DETAILED DESCRIPTION OF THE INVENTION

Figure 1:
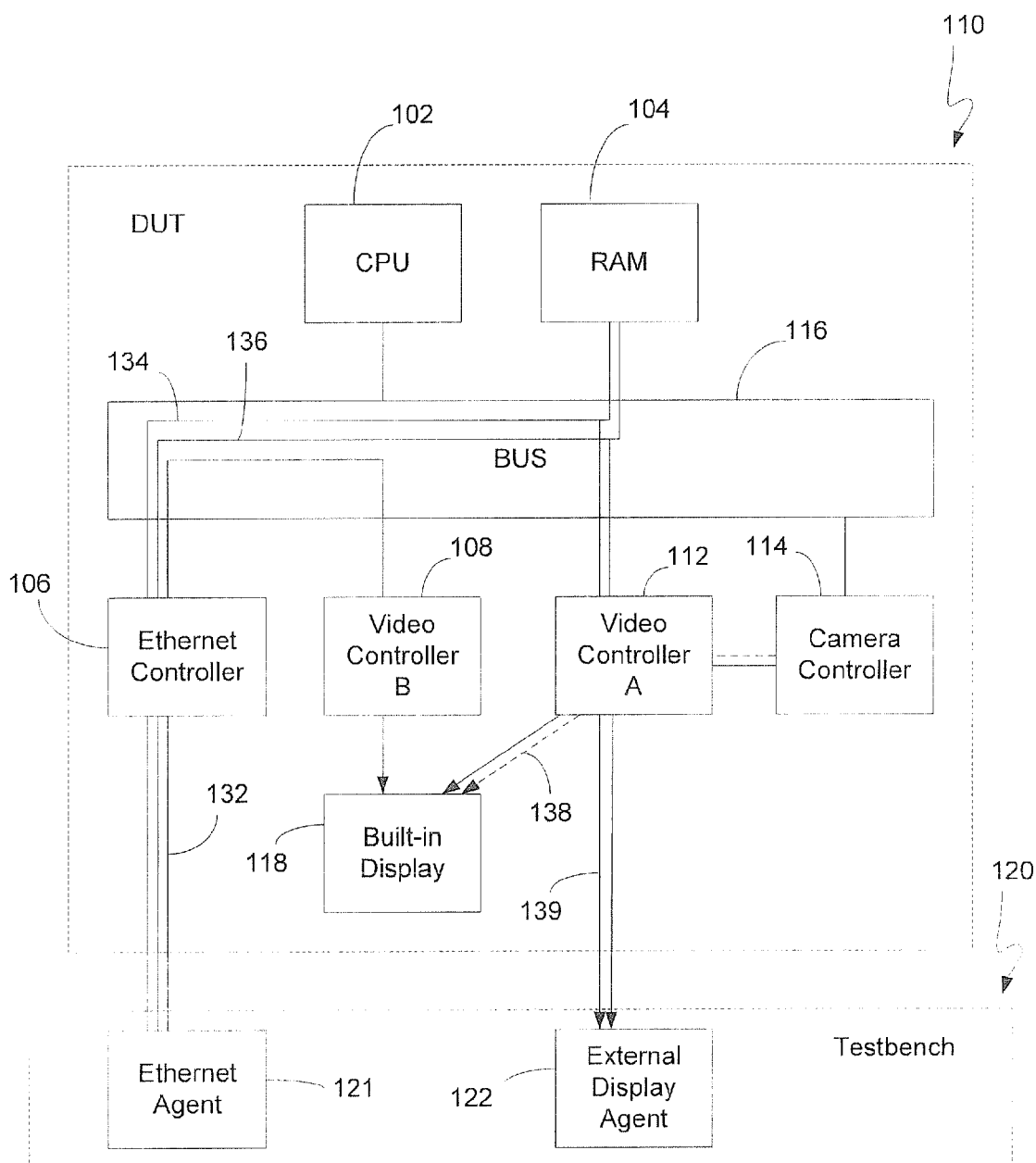
FIG. 1 (prior art) illustrates a simplified schematic diagram of an arrangement for executing system verification tests.

In the following detailed description, numerous specific details are set forth in order to provide a thorough understanding of the methods and systems. However, it will be understood by those skilled in the art that the present methods and systems may be practiced without these specific details. In other instances, well-known methods, procedures, and components have not been described in detail so as not to obscure the present methods and systems.

Although the examples disclosed and discussed herein are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method examples described herein are not constrained to a particular order or sequence. Additionally, some of the described method examples or elements thereof can occur or be performed at the same point in time.

Unless specifically stated otherwise, as apparent from the following discussions, it is appreciated that throughout the specification, discussions utilizing terms such as "adding", "associating" "selecting," "evaluating," "processing," "computing," "calculating," "determining," "designating," "allocating" or the like, refer to the actions and/or processes of a computer, computer processor or computing system, or similar electronic computing device, that manipulate, execute and/or transform data represented as physical, such as electronic, quantities within the computing system's registers and/or memories into other data similarly represented as physical quantities within the computing system's memories, registers or other such information storage, transmission or display devices.

Design IP (Intellectual Property) cores in the Field-Programmable Gate Array (FPGA) world, as well as in general, are characterized by a set of design attributes, or parameters, which affect the way the design behaves. For example: if the design IP is that of a RAM, then the WRITE_MODE could determine how data is stored in the RAM, and whether or not the data output of the RAM reflects the input data.

In order to validly verify a device under test (DUT), it is generally desired to test the DUT with combinations of parameter values, sometimes exhaustively. For example, typically, all major design modes are tested with all possible data-width values.

When using Open Verification Methodology (OVM) or Universal Methodology Verification (UVM) environments, these environments themselves may often become parameterized as well. For example, if the data bus width of the DUT is varying, it will cause the DUT interface to become parameterized, and hence the monitor, driver and other such components may become parameterized as well.

The simple solution to providing high quality IP in the verification challenge of a DUT would be to create an exhaustive set of permutations for all parameters, and fully verify the DUT with each permutation. However, doing so has its disadvantages. Using an exhaustive set of permutations for all parameters, and fully verifying the DUT with each permutation is not scalable. E.g., for a DUT with 20-30 parameters, each having 2 to 10 values, the exhaustive permutation set could reach hundreds of thousands permutations, or even more.

Furthermore doing so is likely to involve extensive simulation time that poses a heavy burden on available computing resources. Moreover, covering all permutations for more complex designs may not be feasible at all.

Typically, system designers, software engineers, and functional verification engineers have had to go to great lengths to individually code executable system-level tests to run use-cases on a System on Chip (or SOC). These engineers and designers would need to be intimately familiar with the individual layout, components, elements, and various Intellectual Property (IP) interconnected within the SOC. The same, very valuable designers would need to individually tailor the code for optimization and execution on a particular system, written specifically for a particular SOC, and manually account for conditions and various types of constraints on the SOC or device. However, such menial test generation by system design engineers is so time consuming, difficult, and expensive as to be impractical.

Recently systems and methods for automated generation of executable system level tests were introduces.

According to such methods, a simplified model or system design, including a topology of a Device under Test (DUT) and a functional description of the components of the DUT, is provided along with at least a partial specification of a scenario, initial action, goal or other such initial direction as provided by a user.

A Constraint Satisfaction Problem (CSP) is then formed by performing a means- end analysis on the initial goal or action to determine what other constituent actions need to be performed to (at least substantially) comply with the specified goal of the user. The collection of actions necessary to perform the initial action or goal are assembled with all of the constraints and conditions into the CSR An "initial action" in the context of the present specification may relate to a single activity, some activities, or any subset of an activity diagram, for example a directive to use some memory or channel, an abstract action that may be concretized to a specific action, etc.

The CSP is preferably constructed in high level e-code or any other such high- level constraint-capable language. The constraint satisfaction problem (CSP) is then transformed from e-code into a Boolean logic formula and is then solved by a constraint solving engine, such as a CSP/SAT (SAT— Boolean Satisfactory Problem) satisfiability solver. This could potentially reside on an external server and may be communicated across a computer network. The CSP, once solved, results in an at least partially scheduled sequential arrangement of the initial action and the requisite constituent actions along with parameters or attributes of the actions that satisfy all constraints and accomplish the goal or intended scenario of the user.

Such sequential arrangement and parameters which comply with the constraints are then used to automatically generate a C-code or a machine executable code for tests to be executed, preferably on the simulated SOC or other such processor.

FIG. 1 (prior art) illustrates a simplified schematic diagram of an arrangement for executing system verification tests. A Device under Test (DUT) 110 operable to executable test code and a test bench 120 device operable to communicate and provide input and receive output from the Device under Test 110. A DUT may include Integrated Circuits (IC) and processing core components. In this example, DUT 110 is a device of integrated circuits and interrelated interconnected components illustratively including CPU 102, RAM 104, Ethernet controller 106, video controller B 108, video controller A 112, camera controller 114 and a built-in display 118, all interconnected by a general purpose Bus 116. At least the Ethernet controller 106 and video controller A112 are each provided a separate means of ingress and egress 132 and 139 respectively to provide output and receive input from an external agent such as test bench 120. Test bench 120 provides two exemplary modules: Ethernet agent 121 and external display agent 122. The Ethernet agent 121 preferably serves to provide simulated input to an Ethernet controller 106 within DUT 110 and also receive output from the Ethernet controller 106. The external display agent 122 of the test bench 120 is meant to simulate an external display to thereby receive input from video controller A 112 and potentially return checksum or confirmation information via external display agent 122 back to video controller A 112.

The DUT 110 may be an actual physical embodiment of the device, or it may merely be a model representation of such a device having individual components defined, data paths therethrough, actions, constraints, and pre/post conditions. Likewise, test bench 120 may also be an actual physical embodied device such as a Field Programmable Gate Array (FPGA) or it may simply be software or data representation thereof as it is merely a verification artifact. In either case, DUT 110 is provided with a plurality of intended data paths such as video flowing from an external Ethernet into Ethernet controller 106, to Bus 116, RAM 104, video controller A 112, and terminating at built-in display 118. Such a data path 134 may represent the flow of video from an external Ethernet or network server through the Ethernet controller, the Bus, into the memory for decoding and storage, then through a video controller A for eventual display on the built-in display 118.

Another exemplary data path is data path 136 whereby data may flow from an external Ethernet agent 121 representing a broader internet or network where data may be stored on an external server brought in through Ethernet controller 106 to the Bus 116, to RAM 104, and then to display externally through video controller A 112 to the external display agent 122. Yet another intended data path 132 may receive input from the Ethernet, pass through Ethernet controller 106, Bus 116, video controller B 108, and terminate through built-in display 118. Yet another intended data path 139 traverses from camera controller 114 through video controller A 112 and passes directly to the external display agent 122.

The test bench device is optional as many tests may be performed entirely within the DUT itself. Generally, a DUT contains a plurality of interconnected components (e.g., CPU, RAM, Bus, Ethernet controller, video controller, camera controller and built-in display). When a testbench is present, it generally includes some other plurality of interconnected components (e.g., Ethernet agent and external display agent). The testbench is typically operably coupled to the inputs and outputs of the DUT. Such an operable coupling allows the testbench to provide stimulus or input to the DUT and also receive output or results from the DUT.

Typically, various constraints limit the actions or attributes of different components within the DUT. For example, a vide controller may be limited to low definition (LD) or standard definition (SD) resolution only. Another example may relate to a limitation that a display may only receive video input from one video processor at a time.

Such constraint, which may be captured for example in system level notation (SLN) for the device or scenario may provide input to a means-end analysis as such: if it is known that the camera may only provide LD or SD resolution then it can be ascertained by the means-end analysis that if high definition (HD) is required, then such high definition video may not be from that specific camera controller as it is only able to LD or SD definition video. Such analysis may seem trivial, but, considered in aggregate with possibly dozens (or hundreds) of such architectural constraints (many of which, the test writer may not even be aware of), factors, and pre-conditions, and combined with a model of the DUT in system level notation, may provide for automatic test generation with merely the provision of a scenario and intended goal or initial/requested action provided by a user.

Another example for a constraint may be that any video streaming over the Ethernet controller 106 or Ethernet itself may not exceed certain number of frames per seconds (e.g., 24 frames per second—FPS). Such constraint may act for example on Ethernet controller 106 or video controller 108. If a video stream (with a frame rate of 24 frames per second) is to be streamed through the system, then through process-of-elimination, as the Ethernet controller cannot be implicated, it must be that either the video resides on the DUT in RAM 104 or the video must come from the camera controller 112 (provided that no other relevant constraint limits this frequency of display). A user, for example, may specify a scenario such as: "play high frequency video at 30 frames per second." The frame rate constraint would inform that such a video cannot be captured through the Ethernet controller 106 but must instead either come from RAM 104 or camera controller 114 according to the system topology or DUT representation. When such action/condition definitions, model representation, and constraints are input into a means-end analysis along with an intended goal of a user, a constraint solving engine, such as a SAT Solver, is preferably used to decipher and transform the scenario and/or goal along with the model and constraints acting thereon to formulate a more specific, fully elaborated, and comprehensive series of actions to be performed to achieve the goal while not violating constraints specified (or implicated).

In System-Level Notation (SLN), constraints are presented as expressions of properties (e.g., equalities, inequalities, greater, lesser, etc.) over scalar attributes or scheduling directives that are generally prefixed with the 'keep' or 'keeping' keywords. A constraint may be seen as a property that must be satisfied in an attribute, set of attributes, or sequence of actions.

An Action is defined as any operation performed by the DUT or Verification Environment (VE) during a test. Such actions may need to be controlled by or visible to a test writer or monitor of test results. There may be primitive actions which are implemented directly by the user in terms of C code and are executed during one continuous stretch of time and within one component; and compound actions which consist of other actions and possibly spanning multiple time slots and possibly multiple components.

A scenario may typically be specified in terms of a compound action. A Condition may be a system state, streamed data, stored data, or notification produced by one action and accessed by others. By requiring some condition, an action may force other actions with certain properties to occur prior to it or contemporaneously therewith. Given a requested action, fulfilling its conditions may involve pulling into the scenario other actions—and their conditions may pull in yet more actions. A legal scenario may be a bipartite graph of actions and conditions.

An attribute may be a parameter of an action or a condition represented as a scalar constant (numeric, Boolean, enumerated, or the like).

An action definition may include individual commands or sub-actions forming a greater action. Conditions serve to functionally limit actions and/or attributes.

Figure 2:
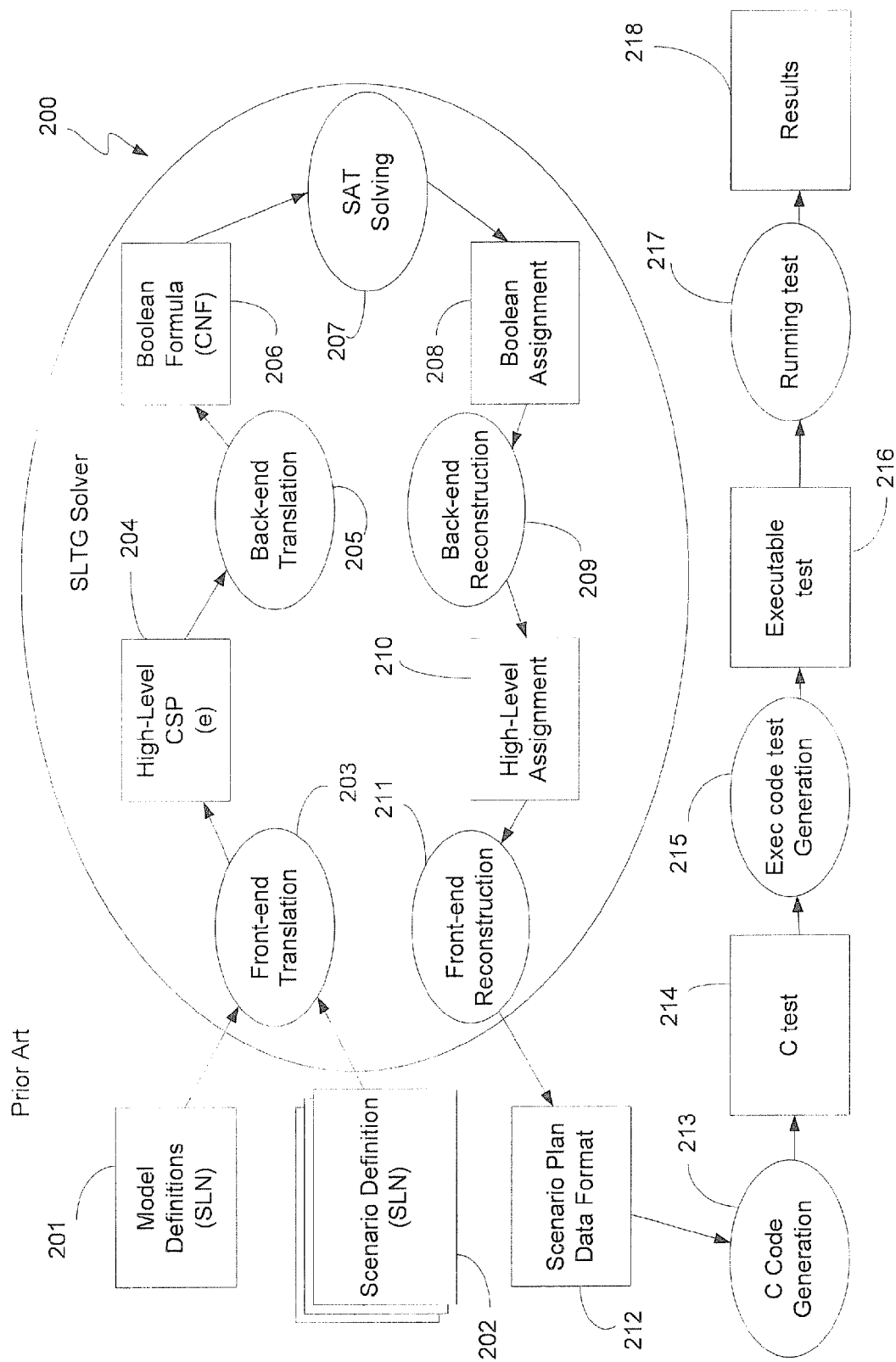
FIG. 2 illustrates an exemplary path from abstract user terms to Boolean formula to be operated upon by a constraint solving engine, and back to user terms to serve as input in an executable test code generation stage.

Recently, a method for automatically generating executable system level tests was described. Shown in FIG. 2 is an exemplary path from abstract user terms to Boolean formula to be operated upon by a constraint solving engine, and back to user terms to serve as input in an executable test code generation stage. Embodiments of the method may include providing a model definition, which includes a topology definition for an abstracted Device under Test (DUT) 201, definitions of actions, conditions, attributes, and constraints; and at least one scenario definition (a plurality are preferably supplied), preferably in system level notation (SLN) 202. The user may provide a single scenario or a plurality of different scenarios 202 to the system level test generation (SLTG) solver 200. Both the model definition 201 and the scenario definition 202 (both preferably in SLN—although any language operable to express, describe, and model the DUT, actions, conditions, attributes, attribute constraints, and the like may suffice) to the front end translation 203 which may transform the user readable high level use cases and high level abstracted system topology definitions from SLN to a high level CSP through a compiler step. Such a compiler step may employ a meta-model and data structures representing the syntactic structures of the input which will be transformed to create an output CSP, preferably in e-code. Front end translation 203 may generally perform several steps in transforming the user model to a CSP model—applying the SLN modeling constructs, including, for example;

1) Parse the input SLN code and construct an abstract syntax tree;

2) Traverse the syntax tree and construct a meta-model of action and condition types with their respective attributes and constraints; and 3) Traverse the meta-model and generate code defining the high level CSP.

This front-end translated combination of the system model, topology, and scenario definitions may be provided in a high level CSP, e.g., e-code. The e-code CSP constraint satisfiability problem (CSP) 204 essentially combines the DUT, model definition, and system topology, with the scenario definitions to assemble the topology based constraints, the scheduling or planning based constraints, and the user or scalar based constraints into a comprehensive listing of requirements for an executable test. The high level CSP in e-code 204 may then be processed through back-end translation 205, for example, to arrive at a Boolean formula in Conjunctive Normal Form (CNF) 206. A Boolean formula CNF is a mathematical formula which combines a comprehensive listing of all of the different topology, planning, and scalar constraints, as specified in the model definitions and scenario definitions. Back-end translation 205, in transforming the high-level CSP to a low-level logical formula of Boolean variables in conjunctive normal form (CNF) which can be provided to the constraint solving engine or SAT solver, generally performs several steps, including: 1) Parse and analyze the e- code and construct a syntax tree; 2) Traverse the syntax tree and construct a meta model of structs (classes), fields, and constraints; and 3) Traverse the meta-model and create a representation.

Once the Boolean formula (CNF) 206 has been formulated, it is passed on to a SAT solving node 207 which is a satisfiability of constraints solver or constraint solving engine. The SAT solver essentially attempts to arrange, sequentially, all of the different actions, sub-actions, conditions, and constraints into a solvable sequence while meeting all constraints as specified.

It will either pass along at least one sequence which meets the specified criteria or return a failure or error code specifying that such solution is not possible. In the event that the constraints are satisfiable, a Boolean assignment 208 is created which is then passed on to another process, a back-end reconstruction process 209 which will translate the Boolean assignment into a high level assignment 210 which should again be human-readable in high-level CSP (essentially comprising structs, arrays, numeric variables, and enumerated variables). The back-end reconstruction process 209 reconstructs from a bit level Boolean assignment to a solution in terms requested by the user. The assignment of Boolean variables is reassembled into full numeric/enumerated scalar values, arrays, and structs, which together constitutes a solution instance of the high-level CSP.

The high-level assignment 210 is then passed on to a front-end reconstruction reprocessing step 211 which will then generate a scenario plan data format 212 which may be a scheduling graph which is at least partially ordered, specifying at least which actions are to be clustered into simultaneous execution and, potentially, which actions must follow or wait for other actions. The front-end reconstruction 211 takes the data structure of the CSP in e-code or high-level assignment 210 and reconstructs the data structure in user terms, preferably, a bipartite graph of actions and conditions, each with their own respective attribute values. This may be performed using the meta-model constructed during the front-end translation step, reading it into the data-structure handed over from the back-end reconstruction. Then the scheduling graph in the scenario plan is constructed, illustratively through the following steps:

1) Collect under a same-time node results from the same action cluster;

2) Add 'after' edge from producer action to its consumer action(s) for every stepwise condition interchange;

3) Add 'after' edge corresponding to an explicitly requested sequencing in the scenario specification; and 4) Add 'after' edge between two actions that require the same resource (in random order).

After adding edges in steps 2-4, the canonical form of the graph is restored by reducing redundant edges and collapsing multiple same-time nodes into one.

The scenario plan data format 212 is suitable for generation of test code as it represents the concrete actions, attribute values, and scheduling relations therebetween. The scenario plan data format 212 is then passed on to a C code generation node 213 which generates a C code test 214. The C code test 214 may then be passed on to a compiler or a generator of executable test code 215. The compiler or generator of executable code tests 215 generates an executable test 216 which may then be run at node 217 either on an actual physical implementation of a System on Chip (SOC) or Device under Test. Alternatively, the Device under Test or SOC may merely be simulated in a server or emulation program. Upon conclusion of the actual test execution, results 218 are output. Results 218 may include a series of snapshots of different system states, variables, attributes, or resources encountered throughout the execution of the test. Furthermore, the results 218 may indicate errors, problems, or conditions encountered throughout the test simulation.

Figure 3:
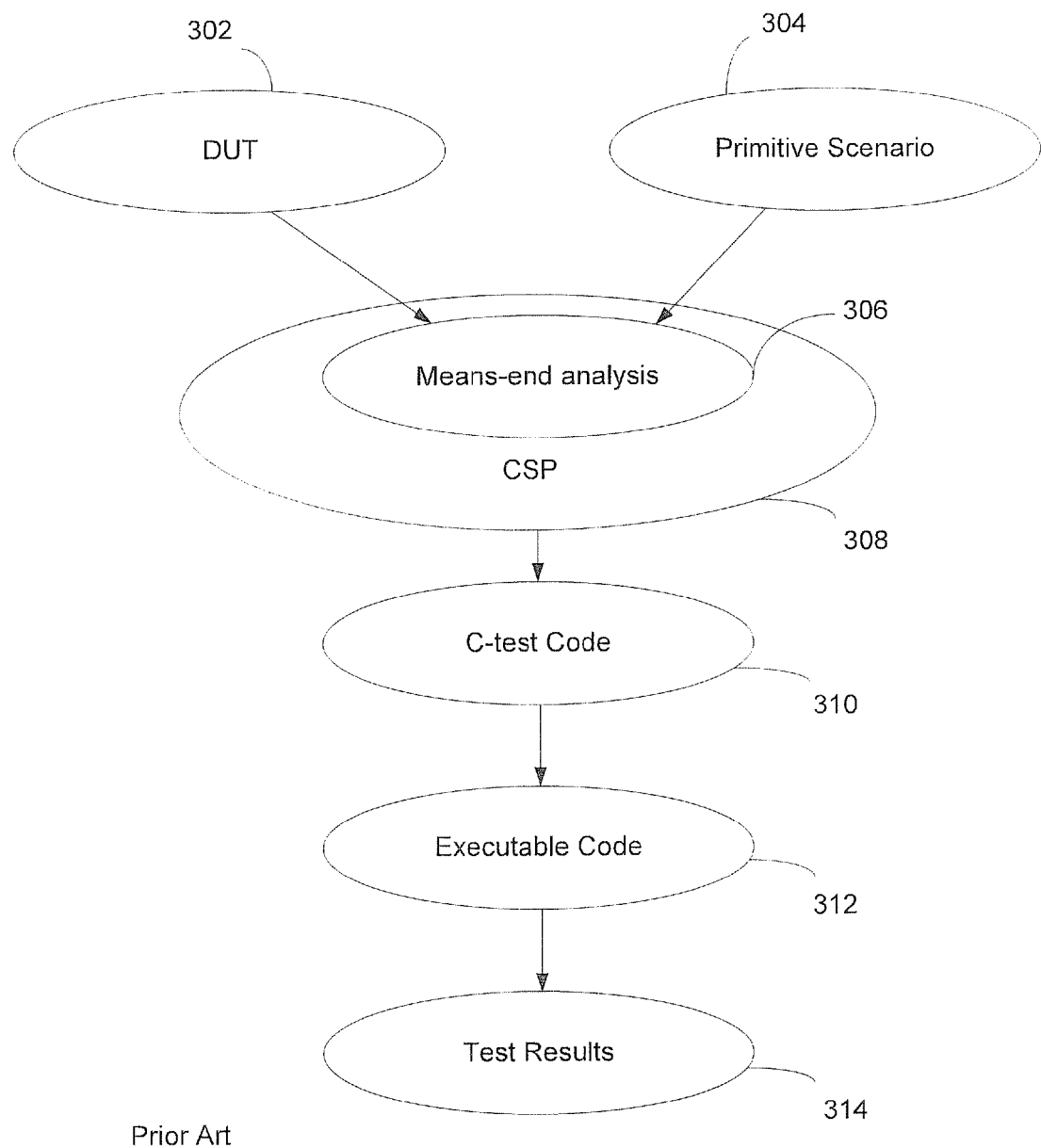
FIG. 3 illustrates a simplified flow diagram of a flow of processes for automatically generating executable system level tests (prior art).

FIG. 3 illustrates a simplified flow diagram of a flow of processes for automatically generating executable system level tests (prior art). At node 302, a DUT abstract, system design, or base model is provided. For example, such abstracted DUT may be provided in system level notation (SLN) or any other language capable of representing components, conditions, attributes, and constraints. The DUT abstract 302 is provided along with a scenario definition 304. In an alternate embodiment, the DUT abstract 302 and the scenario 304 may be provided and considered accordingly in an artificial intelligence means-ends analysis 306 (however, this may preferably be combined with the SAT solver or constraint solving engine in generating the Constraint Satisfaction Problem (CSP)) 308 to combine and form a high level constraint satisfiability problem that considers scalar or user constraints (which may constrain data, attributes, or resources), along with timing, scheduling, or planning constraints (which may relate to the timing of the execution of separate actions), and finally, topology constraints encountered in the DUT or expressly provided in the scenario itself 304. Once all of the three different types of constraints, planning, topology and scalar, have been considered, a constraint satisfiability problem CSP is solved at 308. If the constraint satisfiability problem is not solvable, then, preferably, the SAT solver used to solve the CSP will return an error code.

However, automating the process of creating such data models is often prohibitively expensive in terms of processing power and time. That is to say, a substantial processing power is used to generate numerous code tests, typically taking a long time (in many cases long hours, days or more) to complete the task.

It is asserted that testing a DUT is primarily concerned with verifying the design of the DUT. Moreover, it is asserted that in verifying a DUT design the logic layer, which has to do with the topology of the DUT may ultimately be the main target for the testing, whereas the data layer may be of a substantially lesser importance if at all."Logic-layer", in the context of the present specification relates to a set of actions and attributes that influence the concretization of the scenario/topology/test. "Data layer" in the context of the present specification relates to a set of attributes that do not influence the selection of the test topology A typical DUT design includes various components (see FIG. 1, for example). Each component typically has various attributes associated with it. For example, a CPU may have various assignments related to it, of which some may include, for example: (a) "write data X in address Y of storage device", (b) "display image a on screen of display device", (c) "compress data g", (d) "compute formula f". Some of the attributes relate to the logical layer (topology) of the device, that is to say, they involve some interaction with one or a plurality of system components (e.g., examples (a), (b) hereinabove), whereas other attributes may merely relate to the data layer (e.g., examples (c), (d) hereinabove).

Thus, it was demonstrated that it is possible to automatically generate a complete test scenario from a user-defined partial scenario input (e.g., a partial activity diagram, with some actions and attributes) and translate it into system tests.

Therefore, by recognizing the natural distinction in this domain between the logical layer and the data layer, according to some embodiments of the present invention, it is suggested to divide the constraint satisfiable problem (CSP) into two sub-SCP problems—one for the data layer and one for the logic layer, and to solve them separately.

This means creating, for example, a complete/concrete scenario based on the user-defined partial scenario, addressing only logic layer considerations, and, when this is done, legal data attributes are assigned to the complete scenario.

The concretization of the scenario may be achieved by solving the logic layer CSP that schedules actions and data paths - that form the scenario, and assigning values to the logic-attributes of the actions and data.

The assignment of data attributes can be done by solving the data layer CSP (or multiple CSPs) that consider the constraints on the data attributes, taking into account the constraints of the data-less-concrete-scenario For example, a user requested to display HD-quality video using built-in display 118 (see Fig.1), while Ethernet controller 106 is constrained to only transmit MD and LD video data. As a result, a data path that uses video from camera controller 114 will be selected by the logic layer, and the data attributes selected by the data layer CSP will obey the constraints of the camera controller 114.

Furthermore, according to some embodiments of the present invention, it is suggested to first solve the logic layer CSP problem before solving the data layer CSP problem. Each sub-problem may be solved using the appropriate solving strategy.

According to some embodiments of the present invention, solving of the logic layer CSP is carried out while maintaining the attributes of the solved data layer SCP fixed.

Figure 4:
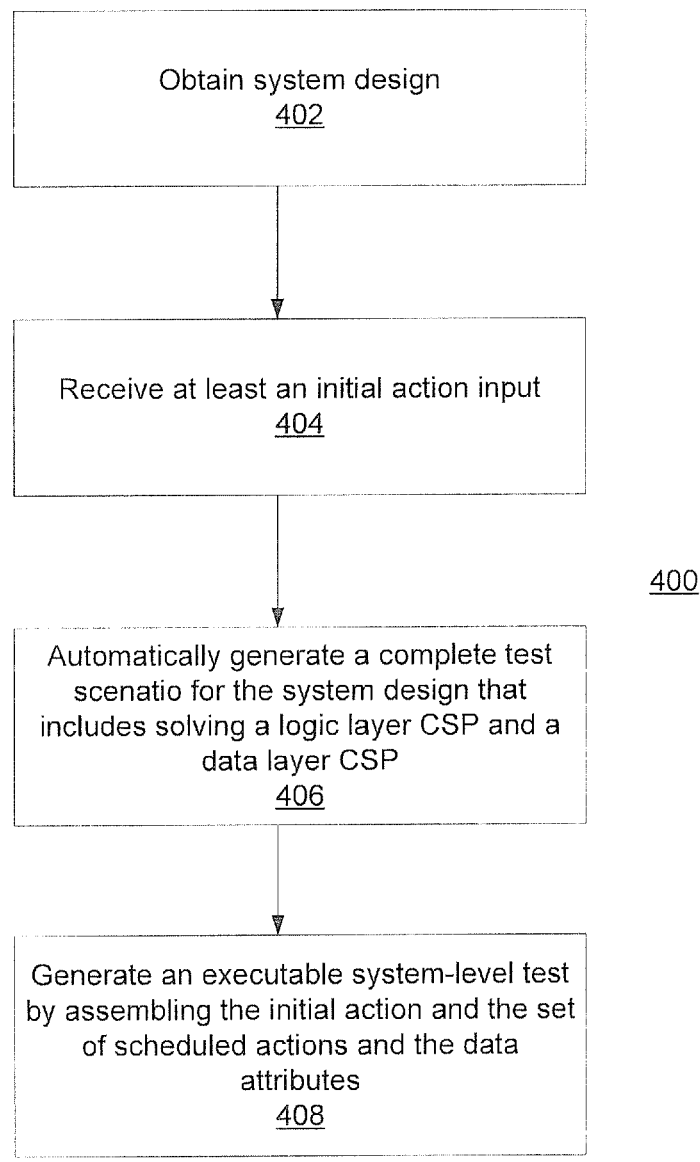
FIG. 4 illustrates a method for automatically generating executable system-level tests, according to some embodiments of the present invention.

FIG. 4 illustrates a method 400 for automatically generating executable system- level tests, according to some embodiments of the present invention. The method 400 may include:

obtaining 402 a system design including interrelation between components of the system design, actions the components are operable to perform, and constraints relating to the performance of the actions;

receiving 404 at least an initial action input to be tested by a user via an input device;

automatically generate a complete test scenatio for the system design that includes solving a logic layer CSP relating to a logic layer of the system design, including automatically scheduling actions and data paths of the test scenario, and assigning values to logic attributes of the actions and data, satisfying constraints relating to the logic layer, and solving a data layer CSP relating to a data layer of the system design, satisfying constraints relating to data attributes taking into account the constraints relating to the logic layer; and generate 408 an executable system-level test by assembling the initial action and the set of scheduled actions and the data attributes wherein the executable system- level test includes executable code operable to perform a verification test on a system represented by the system design.

According to some embodiments of the present invention, the logic layer CSP is solved before solving the data layer CSP.

Such method, according to some embodiments, may include dividing the data layer CSP into independent sub-CSPs. The data layer may be resolved by partitioning it to sub-problems.

The obtaining of the system design may include actually constructing the system design by the user. The system design may include an activity diagram.

A method according to some embodiments may include receiving classification input from the user classifying attributes relating to the system design as logic layer attributes or data layer attributes. This may enhance scalability of the tests generation problem without sacrificing real sociability, and may enjoy the benefit of optimal random distribution of the generated data model.The constraints of the system design according to some embodiments of the present invention may constrain action sequencing, system topological element use, and data values; and the CSP may be solved in a scheduling domain, system topology domain, and a data constraint domain.

The components, actions, and constraints in the system design may be specified, in any suitable language, such as, for example, in e language, HDL, or system C.

According to some embodiments of the present invention, the CSPs may be generated in e language, and may further be translated into a Boolean notation format.

In some embodiments of the present invention, solving the CSPs may be accomplished by forming an array of successive system states and an array of successive actions constrained by the constraints limiting preceding and succeeding system states.

According to some embodiments of the present invention, the method may further include executing the executable system-level test and recording successive system states throughout the execution of the test.

A test-bench may receive output from the system design during the test and provides input thereto.

In some embodiments of the present invention, the initial action may be one or a plurality of composite use-case modeling real-world operations of the system design.

In some embodiments, the CSP may be transmitted across a network to a remote processing unit system, and solved thereon.

A method according to some embodiments of the present invention may include collecting a plurality of solutions to the CSP, randomly selecting solutions, generating system-level tests therefrom, and executing each of the plurality of system-level tests.

Figure 5:
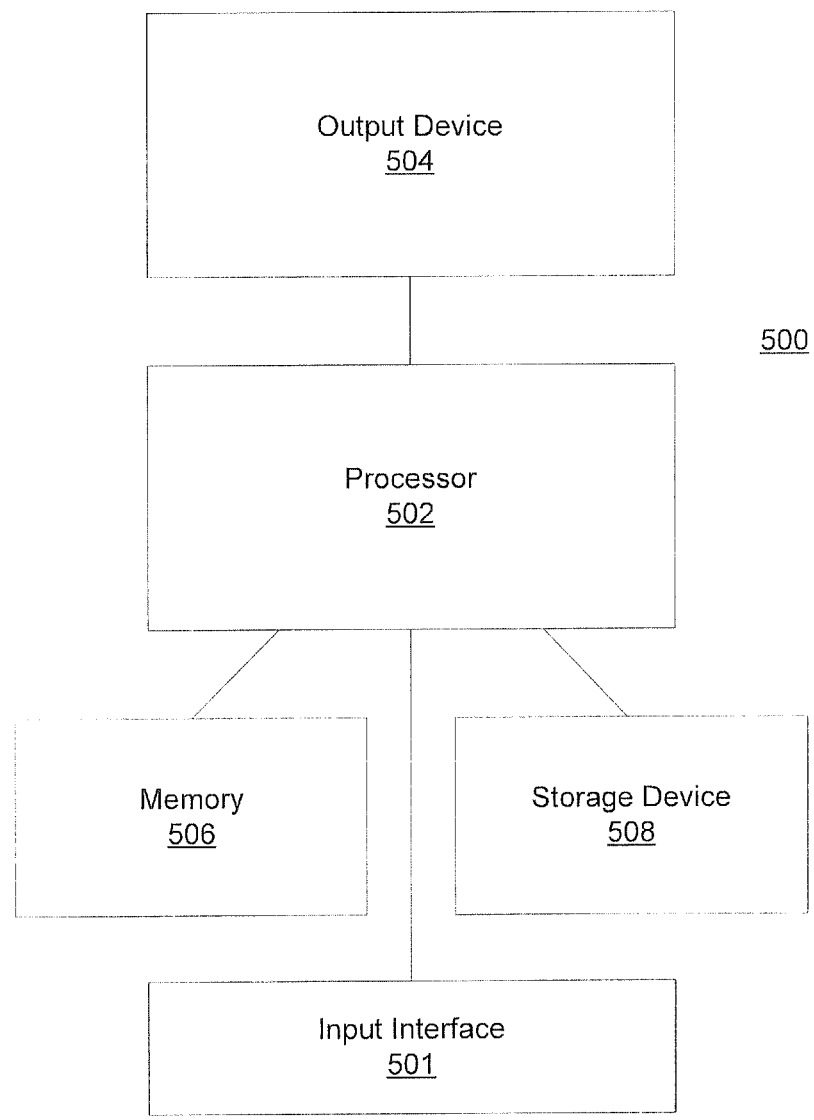
FIG. 5 illustrates a system for automatically generating executable system-level tests, according to some embodiments of the present invention.

FIG. 5 illustrates a system 500 for automatically generating executable system- level tests according to some embodiments of the present invention. System 500 may include a processor 502 (e.g., one or a plurality of processors, on a single machine or distributed on a plurality of machines) for executing a method according to some embodiments of the present invention. Processing unit 502 may be configured to obtain a system design including interrelation between components of the system design, actions the components are operable to perform, and constraints relating to the performance of the actions. Processor 502 may also be configured to receive at least an initial action input by a user via an input device. Processor 502 may also be configured to generate two constraint satisfaction problems (CSP), a logic layer CSP and a data layer CSP, each CSP including: automatically adding to the CSP a set of requisite actions to the initial action, wherein the set of requisite actions are added responsive to an evaluation of the system design to determine other actions required to perform the initial action; and automatically adding to the CSP a set of constraints accumulated from the initial action and each action of the set of requisite actions. Processor 502 may further be configured to consecutively solve the two CSPs to thereby simultaneously satisfy the set of constraints; generating an executable system-level test by assembling the initial action and the set of requisite actions in an at least partial sequence responsive to a solution of the CSP, wherein the executable system-level test includes executable code operable to perform a verification test on a system represented by the system design.

Processor 502 may be linked with memory 506 on which a program implementing a method according to some embodiments of the present invention and corresponding data may be loaded and run from, and storage device 508, which includes a non-transitory computer readable medium (or mediums) such as, for example, one or a plurality of hard disks, flash memory devices, etc. on which a program implementing a method according to some embodiments of the present invention and corresponding data may be stored. System 400 may further include an output device 504 (e.g., display device such as CRT, LCD, LED etc.) on which one or a plurality user interfaces associated with a program implementing a method according to some embodiments and corresponding data may be presented. System 500 may also include input interface 501, such as, for example, one or a plurality of keyboards, pointing devices, touch sensitive surfaces (e.g. touch sensitive screens), etc. for allowing a user to input commands and data.

Some embodiments of the present invention may be embodied in the form of a system, a method or a computer program product. Similarly, some embodiments may be embodied as hardware, software or a combination of both. Some embodiments may be embodied as a computer program product saved on one or more non-transitory computer readable medium (or media) in the form of computer readable program code embodied thereon. Such non-transitory computer readable medium may include instructions that when executed cause a processor to execute method steps in accordance with examples. In some examples the instructions stores on the computer readable medium may be in the form of an installed application and in the form of an installation package.

Such instructions may be, for example, loaded by one or more processors and get executed.

For example, the computer readable medium may be a non-transitory computer readable storage medium. A non-transitory computer readable storage medium may be, for example, an electronic, optical, magnetic, electromagnetic, infrared, or semiconductor system, apparatus, or device, or any combination thereof.

Computer program code may be written in any suitable programming language. The program code may execute on a single computer system, or on a plurality of computer systems.

Some embodiments are described hereinabove with reference to flowcharts and/or block diagrams depicting methods, systems and computer program products according to various embodiments.

Features of various embodiments discussed herein may be used with other embodiments discussed herein. The foregoing description of the embodiments has been presented for the purposes of illustration and description. It is not intended to be exhaustive or limiting to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes that fall within the true spirit of the present invention.

What is claimed is:

1. A method for automatically generating executable system-level tests, the method comprising:
   obtaining a system design including interrelation between components of the system design, actions the components are operable to perform, and constraints relating to the performance of the actions;
   receiving at least an initial action input to be tested by a user via an input device;
   automatically generating a complete test scenario for the system design comprising:
      dividing a constraint satisfiability problem (CSP) into a logic layer CSP related to a logic layer of an executable system-level test for the system design and a data layer CSP related to a data layer of the executable system-level test for the system design;
      solving the logic layer CSP including automatically scheduling actions and data paths of the test scenario, and assigning values to logic attributes of the actions and data, satisfying constraints related to the logic layer, and
      solving the data layer CSP satisfying constraints relating to data attributes taking into account the constraints relating to the logic layer; and
   generating the executable system-level test by assembling the initial action and a set of scheduled actions and data paths and the data attributes from the solved logic layer CSP and the solved data layer CSP, wherein the executable system-level test includes executable code operable to perform a verification test on a system represented by the system design.

2. The method of claim 1, wherein automatically generating a complete test scenario comprises solving the logic layer CSP before solving the data layer CSP.

3. The method of claim 1, further comprising dividing the data layer CSP into independent sub-problems, where each sub-problem is a CSP.

4. The method of claim 1, wherein the obtaining of the system design comprises constructing the system design.

5. The method of claim 1, wherein the system design includes an activity diagram.

6. The method of claim 1, further comprising receiving classification input from the user classifying attributes relating to the system design as logic layer attributes or data layer attributes.

7. A non-transitory computer readable storage medium for automatically generating executable system-level tests, having stored thereon instructions that when executed by a processor will cause the processor to:
   obtain a system design including interrelation between components of the system design, actions the components are operable to perform, and constraints relating to the performance of the actions;
   receive at least an initial action input to be tested by a user via an input device;
   automatically generate a complete test scenario for the system design comprising:
      dividing a constraint satisfiability problem (CSP) into a logic layer CSP related to a logic layer of an executable system-level test for the system design and a data layer CSP related to a data layer of the executable system-level test for the system design;
      solving the logic layer CSP including automatically scheduling actions and data paths of the test scenario, and assigning values to logic attributes of the actions and data, satisfying constraints related to the logic layer, and
      solving the data layer CSP satisfying constraints relating to data attributes taking into account the constraints relating to the logic layer; and
   generate the executable system-level test by assembling the initial action and the set of scheduled actions and the data attributes from the solved logic layer CSP and the solved data layer CSP, wherein the executable system-level test includes executable code operable to perform a verification test on a system represented by the system design.

8. The non-transitory computer readable storage medium of claim 7, wherein the logic layer CSP is solved before solving the logic layer CSP.

9. The non-transitory computer readable storage medium of claim 7, further having stored thereon instructions that when executed by a processor will cause the processor to divide the data layer CSP into sub-problems, each of the sub-problems being a CSP.

10. The non-transitory computer readable storage medium of claim 7, wherein obtaining of the system design comprises constructing the system design.

11. The non-transitory computer readable storage medium of claim 7, wherein the system design includes an activity diagram.

12. The non-transitory computer readable storage medium of claim 7, further having stored thereon instructions that when executed by a processor will cause the processor to receive classification input from the user classifying attributes relating to the system design as logic layer attributes or data layer attributes.

13. A system for automatically generating executable system-level tests, the system comprising:
   a memory and a processing unit configured to:
      obtain a system design including interrelation between components of the system design, actions the components are operable to perform, and constraints relating to the performance of the actions;
      receive at least an initial action input to be tested by a user via an input device;
      automatically generate a complete test scenario for the system design comprising:
         dividing a constraint satisfiability problem (CSP) into a logic layer CSP related to a logic layer of an executable system-level test for the system design and a data layer CSP related to a data layer of the executable system- level test for the system design;
         solving the logic layer CSP including automatically scheduling actions and data paths of the test scenario, and assigning values to logic attributes of the actions and data, satisfying constraints related to the logic layer, and
         solving the data layer CSP satisfying constraints relating to data attributes taking into account the constraints relating to the logic layer; and
      generate the executable system-level test by assembling the initial action and the set of scheduled actions and the data attributes from the solved logic layer CSP and the solved data layer CSP, wherein the executable system-level test includes executable code operable to perform a verification test on a system represented by the system design.

14. The system of claim 13, wherein the processor is configured to solve the logic layer CSP before solving the data layer CSP.

15. The system of claim 13, wherein the processor is configured to divide the data layer CSP into sub-problems, each sub-problem being a CSP.

16. The system of claim 13, wherein obtaining of the system design comprises constructing the system design.

17. The system of claim 13, wherein the executable system-level test includes an activity diagram.

18. The system of claim 13, the processor is further configured to receive classification input from the user classifying attributes relating to the system design as logic layer attributes or data layer attributes.

* * * * *